United States Patent [19]

Kuzyk

[11] Patent Number: 5,311,811

[45] Date of Patent: May 17, 1994

[54] BREWING CONTAINER

[76] Inventor: Ron D. Kuzyk, Box 599, Marysville, British Columbia, Canada, V0B-1Z0

[21] Appl. No.: 58,150

[22] Filed: May 10, 1993

[51] Int. Cl.$^5$ .............................................. C12G 1/02
[52] U.S. Cl. ................................... 99/277.1; 99/342; 210/242.1; 220/327
[58] Field of Search ...................... 99/277.1, 278, 277, 99/275, 276, 348, 342; 220/327, 328, 316, 721; 210/242.1

[56] References Cited

U.S. PATENT DOCUMENTS

| | | | |
|---|---|---|---|
| 2,599,072 | 6/1952 | Schweiso | 220/316 |
| 2,695,725 | 11/1954 | Chatfield | 220/327 |
| 3,109,812 | 11/1963 | McAulay | 210/242.1 |
| 3,573,928 | 4/1971 | Marotta et al. | 99/277.1 |
| 4,371,550 | 2/1983 | Nagashima et al. | 99/277.1 |

FOREIGN PATENT DOCUMENTS 822011  10/1959  United Kingdom ................ 220/327

*Primary Examiner*—Robert W. Jenkins
*Attorney, Agent, or Firm*—Leon Gilden

[57] ABSTRACT

A brewing container particularly for use in the making of beer, wherein the container includes a container lid received upon an uppermost end of the container, having an annular flange, with the annular flange including securement rods arranged for reception through the flange for fixed securement of the lid to the flange. An outlet valve mounted in adjacency to the floor of the container permits selective flow of fluid from within the container subsequent to brewing procedure.

3 Claims, 4 Drawing Sheets

BREWING CONTAINER

BACKGROUND OF THE INVENTION

1. Field of the Invention

The field of invention relates to container apparatus, and more particularly pertains to a new and improved brewing container wherein the same is directed for the securement of pressurized cooking of a fluid.

2. Description of the Prior Art

U.S. Pat. Nos. 4,371,550 and 3,573,928 are indicative of prior art brewing procedures for beer, wherein the instant invention attempts to overcome deficiencies of the prior art by directing a container structure specifically for the brewing of beer and in this respect, the present invention substantially fulfills this need.

SUMMARY OF THE INVENTION

In view of the foregoing disadvantages inherent in the known types of container apparatus now present in the prior art, the present invention provides a brewing container wherein the same is directed to the pressurized brewing of fluid such as beer. As such, the general purpose of the present invention, which will be described subsequently in greater detail, is to provide a new and improved brewing container which has all the advantages of the prior art container apparatus and none of the disadvantages.

To attain this, the present invention provides a brewing container particularly for use in the making of beer, wherein the container includes a container lid received upon an uppermost end of the container, having an annular flange, with the annular flange including securement rods arranged for reception through the flange for fixed securement of the lid to the flange. An outlet valve mounted in adjacency to the floor of the container permits selective flow of fluid from within the container subsequent to a brewing procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. there are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved brewing container which has all the advantages of the prior art container apparatus and none of the disadvantages.

It is another object of the present invention to provide a new and improved brewing container which may be easily and efficiently manufactured and marketed.

It is a further object of the present invention to provide a new and improved brewing container which is of a durable and reliable construction.

An even further object of the present invention is to provide a new and improved brewing container which is susceptible of a low cost of manufacture with regard to both materials and labor, and which accordingly is then susceptible of low prices of sale to the consuming public, thereby making such brewing containers economically available to the buying public.

Still yet another object of the present invention is to provide a new and improved brewing container which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
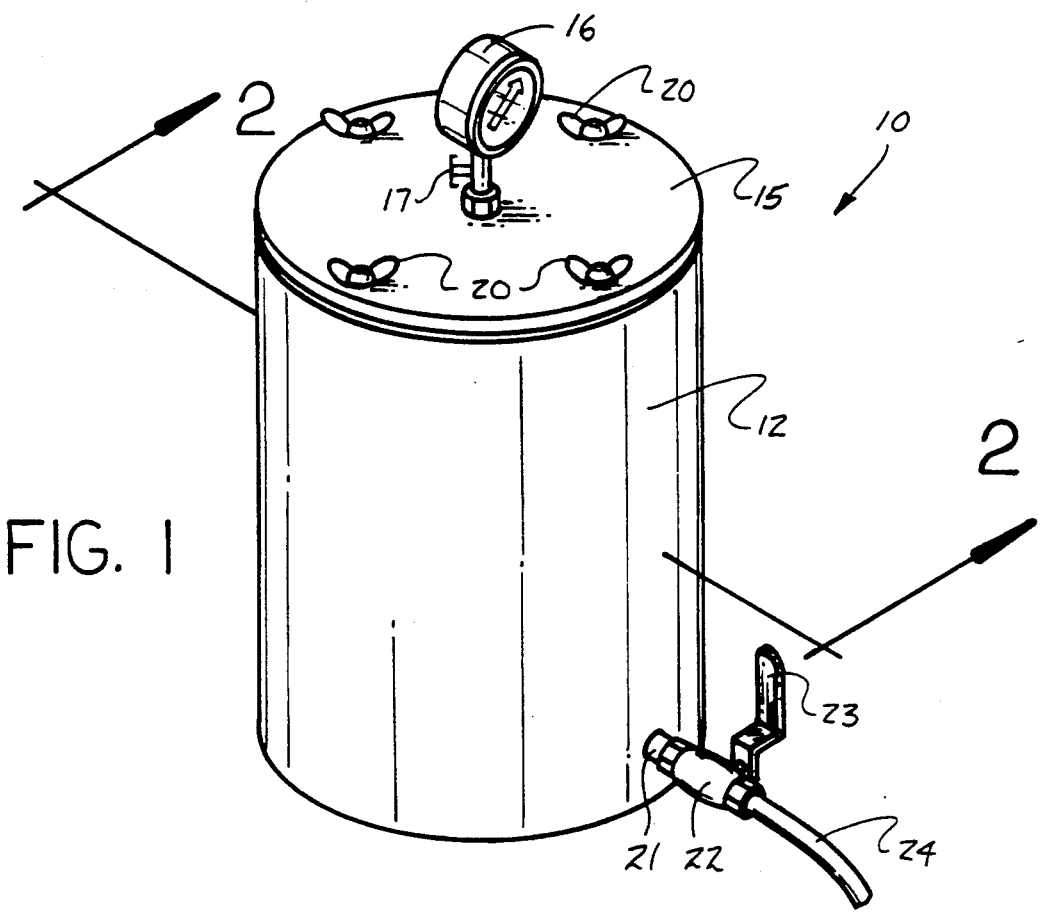
FIG. 1 is an isometric illustration of the invention.
Figure 2:
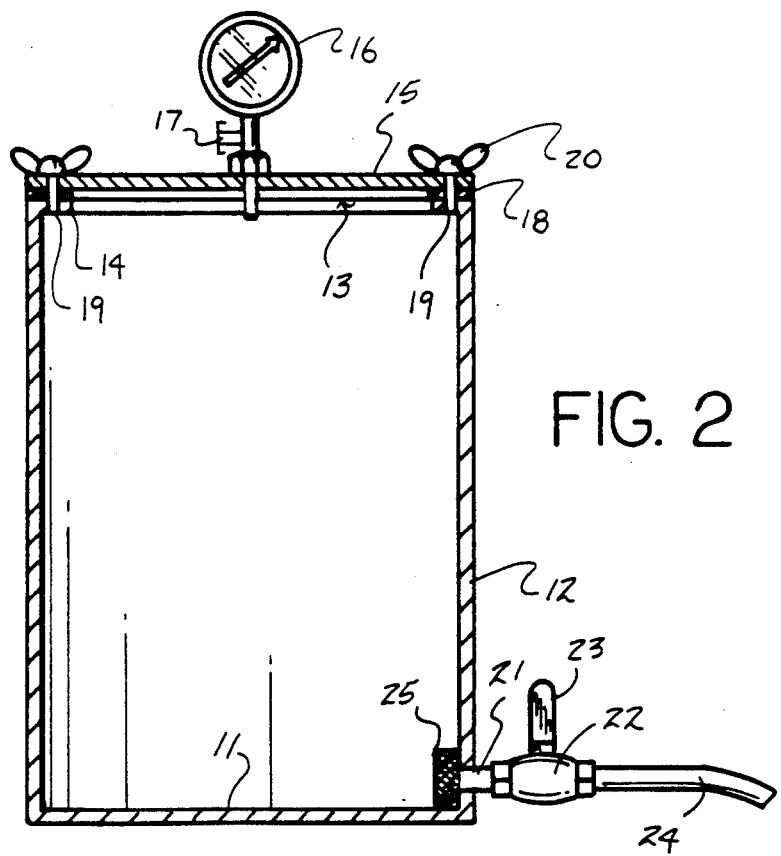
FIG. 2 is an orthographic view, taken along the lines 2—2 of FIG. 1 in the direction indicated by the arrows.
Figure 3:
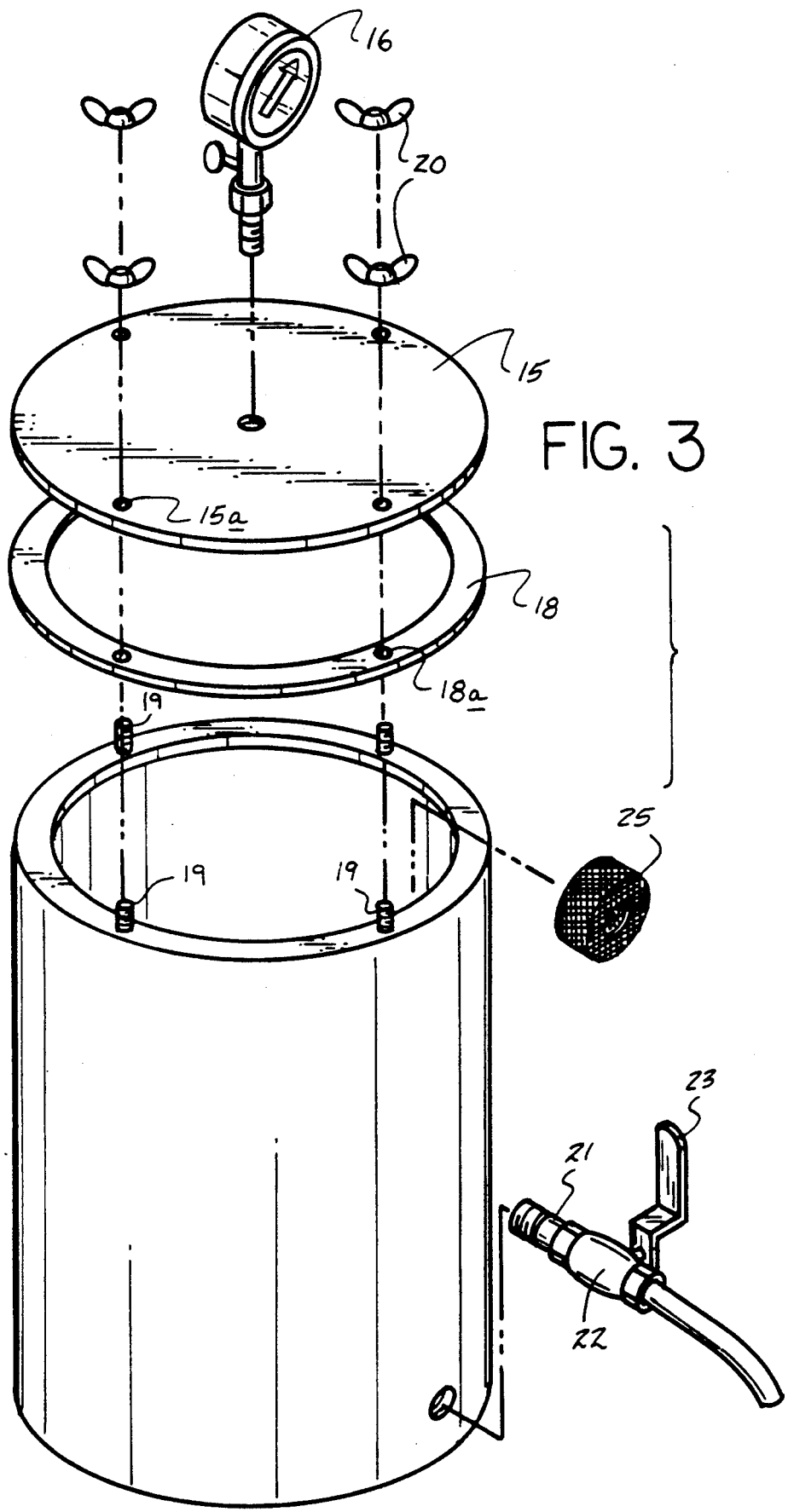
FIG. 3 is an isometric illustration of the invention in an exploded illustration.

With reference now to the drawings, and in particular to FIGS. 1 to 7 thereof, a new and improved brewing container embodying the principles and concepts of the present invention and generally designated by the reference numerals 10 and 10a will be described.

More specifically, the brewing container 10 of the instant invention essentially comprises an organization to include a container floor 11, with a surrounding container side wall 12 extending from the container floor terminating at a container entrance 13 directed into the side wall 12, with a side wall annular flange 14 oriented radially into the container entrance 13 in a substantially parallel relationship relative to the floor 11. A lid plate 15 is provided of a rigid construction, having a pressure indicator head 16, including a relief pipe 17. An annular array of lid apertures 15a are provided through the lid plate 15, with an annular sealing gasket 18 interposed between the lid plate 15 and the annular flange 14, with gasket apertures 18a arranged for coaxial alignment with the lid apertures 15a for receiving an individual one of an annular array of lid securement rods 19 fixedly and orthogonally mounted to the annular flange 14. Once the securement rods 19 are directed through the gasket 18 and the lid plate 15, fasteners 20 are secured about the rods 19 to fixedly mount the lid plate 15 to the side wall 12.

An outlet conduit 21 is directed through the side wall 12 in adjacency to the floor 11 in fluid communication to a valve 22 having an actuator lever 23. A fluid delivery tube 24 extends from the valve 22. In this manner, pivoting of the actuator lever 23 is arranged to open the valve for release of fluid through the valve 22 and through the delivery tube 24. A filter screen 25 is mounted within the container for filtration of fluid directed to the outlet conduit 21.

Figure 4:
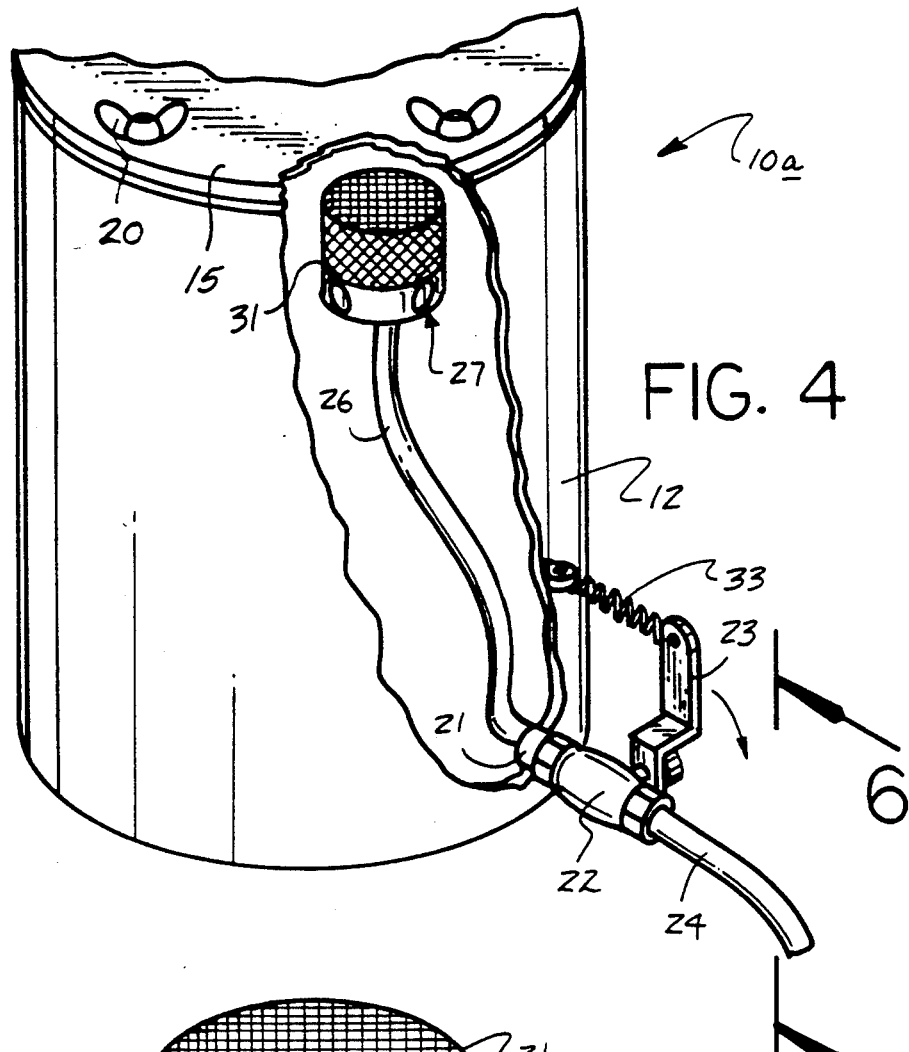
FIG. 4 is an isometric view, partially in section, of the modified container structure.
Figure 5:
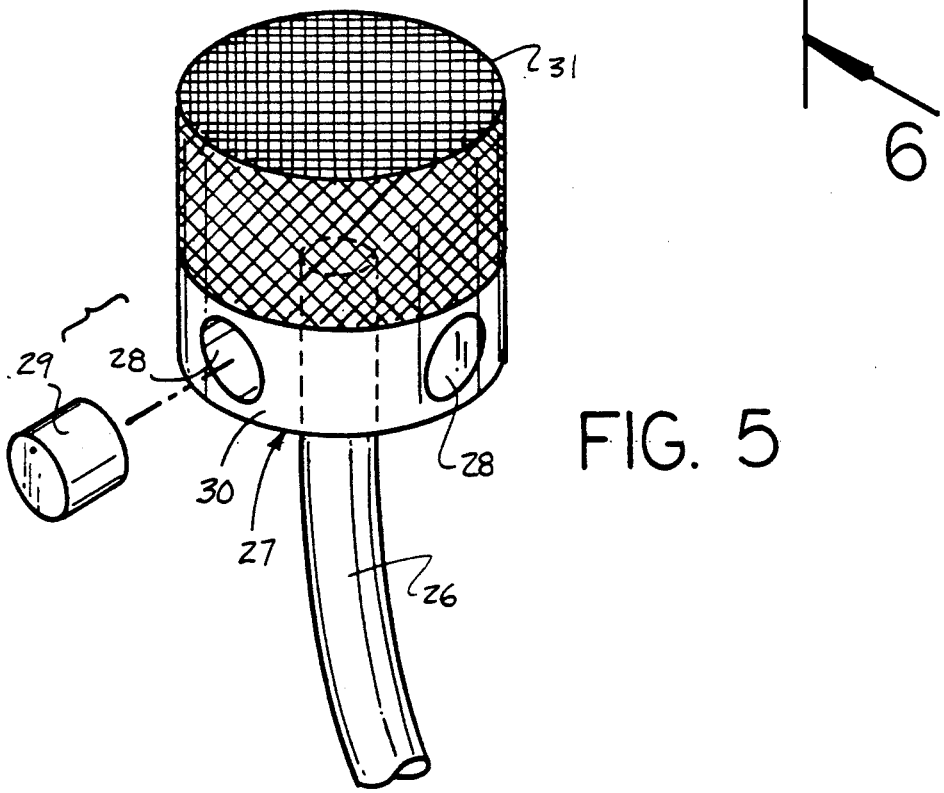
FIG. 5 is an enlarged isometric illustration of a filtration head for use by the container as set forth in FIG. 4.
Figure 6:
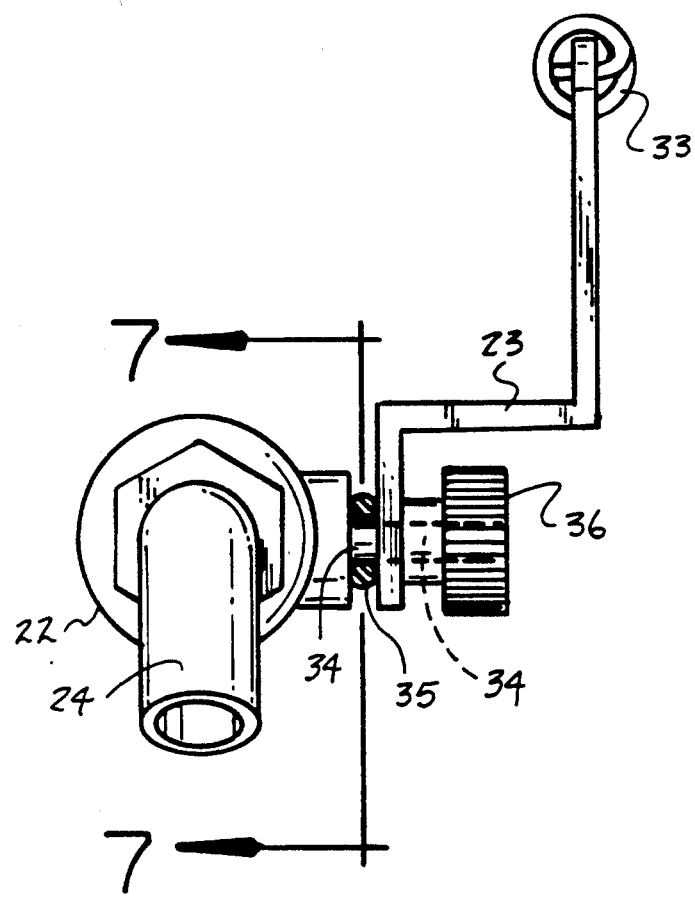
FIG. 6 is an orthographic view, taken along the lines 6—6 of FIG. 5 in the direction indicated by the arrows.
Figure 7:
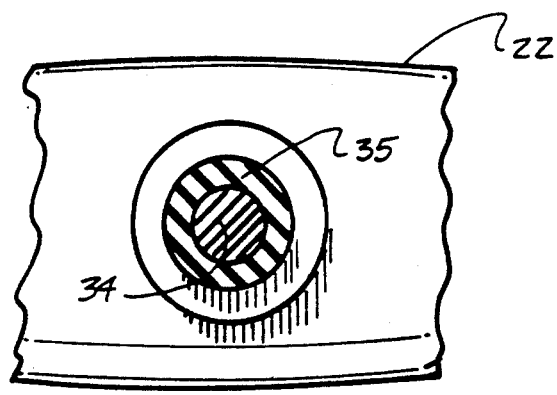
FIG. 7 is an orthographic view, taken along the lines 7—7 of FIG. 6 in the direction indicated by the arrows.

The apparatus 10a, as indicated in FIG. 4 for example, employs in lieu of the filter screen 25 and its mounting to the outlet conduit 21, a flexible conduit 26 extending from the outlet conduit 21 terminating in a buoyant head 27, having a specific gravity less than one to effect flotation of the buoyant head 27, with the buoyant head including the flexible conduit 26 directed therethrough for directing fluid within the container into the flexible conduit 26 through an associated filter screen head 31 mounted to the buoyant head 27 extending therefrom. The buoyant head 27 includes a head side wall 30 having a plurality of bores 28 directed therein in a radial aligned relationship, such that each of the bores is arranged for complementary reception of a weighted plug member 29 whose individual specific gravity is essentially greater than one to permit the buoyant head to be controlled as to its level of flotation within the container to permit individuals to obtain fluid at certain levels within the container depending upon the number of plugs 29 directed into the bores 28. Without the plugs 29, the head is directed to float in adjacency to the surface of the fluid, wherein positioning of the plug members 29 within the head 27 will sink the head to differing levels depending upon the number of plugs 29 directed into the head 27.

A return spring 33 is interposed between the actuator lever 23 and the container side wall 12 to maintain the lever such that it is arranged in a substantially parallel relationship relative to the side wall 12 to typically curtail fluid flow through the valve 22. Further, to provide for metering of fluid such that upon pivoting of the lever 23 relative to the valve 22, the lever 23 (see FIGS. 6 and 7) is fixedly mounted to an actuator lever axle 34, with a friction ring 35 interposed between the lever 23 and the valve 22, with the axle 34 extending through the lever and there beyond for threadedly receiving a clamping knob 36. The clamping knob therefore is arranged to provide for differing pressures directed into the friction ring such that pivoting of the lever 23 is controlled such that the spring 33 effects a time delay when the lever 23 is pivoted forwardly, in a manner as indicated by the arrow in FIG. 4. The thusly slowed rate of return of the lever 23 by varying the clamping of the friction ring 35 and the clamping of the actuator lever 23 relative to the valve 22 provides for metered fluid flow through the valve 22 prior to the lever being returned to a parallel relationship relative to the side wall 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A brewing container, comprising,
   a floor, the floor including a side wall extending form the floor terminating in a container entrance spaced from the floor, wherein the container entrance includes an annular flange radially directed into the container entrance from the side wall, and
   a lid plate arranged for securement to the flange, and securement means for securing the lid plate to the flange, and
   the securement means includes an annular array of securement rods fixedly and orthogonally mounted to the flange, and the lid plate including an annular array of lid apertures, wherein each of said lid apertures is arranged for coaxial alignment with one of said securement rods, and an annular sealing gasket interposed between the lid plate and the flange, wherein the sealing gasket includes an annular array of gasket apertures, wherein each of said gasket apertures is arranged for alignment with one of said lid apertures and one of said securement rods, and each of the securement rods having a fastener mounted to said each of the securement rods for securing the lid plate and the gasket to the annular flange, and
   a pressure indicator head mounted to the lid plate, and
   an outlet conduit directed into the side wall in adjacency to the floor, and a valve mounted to the outlet conduit exteriorly of the container, the valve including an actuator lever, the actuator lever including an axle fixedly mounted to the actuator lever, the axle directed into the valve, and a flexible conduit mounted to the outlet conduit within the container, with the flexible conduit having a conduit first end secured to the outlet conduit, and a conduit second end, the conduit second end including a buoyant head, with the conduit second end directed through the buoyant head, and the buoyant head including a filter screen head extending over the buoyant head and the conduit second end.

2. A brewing container as set forth in claim 1 wherein the buoyant head includes a head side wall, and the head side wall including a plurality of head bores directed into the head, with each of the head bores arranged to receive a plug member therewithin, and each plug member of said plug members having a specific gravity greater than one, wherein said buoyant head is formed of a specific gravity less than one permitting the buoyant head to sink within a body of fluid when the plugs are directed into said bores.

3. A brewing container as set forth in claim 2 including a return spring mounted to said actuator lever and to said container side wall to bias the actuator lever in a parallel relationship relative to said side wall, and a friction ring positioned about the axle interposed between the actuator lever and the valve, with the axle directed through the actuator lever and including a clamping knob threadedly directed onto the axle in adjacency to the lever to permit compression of the friction ring between the actuator lever and the valve to slow pivoting of the actuator lever to said parallel relationship to said container side wall.

* * * * *